(12) United States Patent
Wray

(10) Patent No.: US 6,973,839 B2
(45) Date of Patent: *Dec. 13, 2005

(54) ELECTROMAGNETIC FLOW METER HAVING PROCESSING MEANS RESOLVING OUTPUT DATA INTO A NON-FLOW WAVEFORM COMPONENT

(75) Inventor: Troy Wray, Gloucestershire (GB)

(73) Assignee: ABB Limited, Cheshire (GB)

( * ) Notice: Subject to any disclaimer, the term of this patent is extended or adjusted under 35 U.S.C. 154(b) by 0 days.

This patent is subject to a terminal disclaimer.

(21) Appl. No.: 10/817,327

(22) Filed: Apr. 2, 2004

(65) Prior Publication Data

US 2004/0267463 A1    Dec. 30, 2004

(30) Foreign Application Priority Data

| Apr. 2, 2003 | (GB) | ................................... 0307637 |
| Jul. 3, 2003 | (GB) | ................................... 0315612 |

(51) Int. Cl.[7] .............................................. G01F 1/58
(52) U.S. Cl. ..................................... 73/861.12; 702/45
(58) Field of Search ........................ 73/861.17, 861.16, 73/861.12; 702/38, 45, 50

(56) References Cited

U.S. PATENT DOCUMENTS

| 4,644,799 | A | | 2/1987 | Tomita ..................... 73/861.12 |
| 4,651,286 | A | * | 3/1987 | Fukai et al. ................... 702/45 |
| 4,709,583 | A | * | 12/1987 | De Paepe et al. ......... 73/861.17 |
| 4,953,408 | A | * | 9/1990 | Appel et al. .............. 73/861.16 |
| 5,621,177 | A | * | 4/1997 | Torimaru .................. 73/861.16 |
| 6,173,616 | B1 | * | 1/2001 | Tomita ..................... 73/861.17 |
| 6,634,238 | B2 | * | 10/2003 | Budmiger ................ 73/861.17 |
| 6,845,330 | B2 | * | 1/2005 | Okuda et al. .................. 702/38 |
| 2003/0029250 | A1 | | 2/2003 | Keech et al. ............. 73/861.17 |

FOREIGN PATENT DOCUMENTS

| GB | 1586417 A | 3/1981 |
| GB | 2084740 A | 4/1982 |
| GB | 2380798 A | 4/2003 |

* cited by examiner

Primary Examiner—Harshad Patel
(74) Attorney, Agent, or Firm—Knobbe Martens Olson & Bear LLP

(57) ABSTRACT

A method of obtaining a measure of flow from an electromagnetic flow meter is disclosed. A shaped excitation waveform is applied to the flow meter and an output is received from the meter. The sampled output data from the meter is then resolved into a non-flow waveform component and a flow waveform component to derive a measure of flow. Resolving the data into expected waveform components rather than correlating each frequency component of the sampled output data with a sine wave may allow readings to be obtained without processing each frequency component separately. Also, the method may allow more accurate removal of the non-flow component from the output signal, and may decrease the time delay before the initial reading and allow the use of a greater reading repetition rate.

41 Claims, 5 Drawing Sheets

ELECTROMAGNETIC FLOW METER HAVING PROCESSING MEANS RESOLVING OUTPUT DATA INTO A NON-FLOW WAVEFORM COMPONENT

CROSS-REFERENCE TO RELATED APPLICATIONS

This application is related to U.S. patent application Ser. No. 10/817,765, filed on the same day as the present application, having the same inventor as the present application, and entitled "ELECTROMAGNETIC FLOW METER". The disclosure of the above-described filed application is hereby incorporated by reference.

BACKGROUND OF THE INVENTION

The present invention relates to electromagnetic flow meters. However, aspects of signal processing techniques disclosed herein may be more broadly applied. The operating principles of Electromagnetic Flow Meters are well known, discussed for example in GB-A-2,380,798.

Where the sensing electrodes are in contact with the fluid, due to electrochemical or other effects, a DC potential is usually present across the electrodes even when there is no coil excitation, i.e. no field. That component of the signal is independent of the flow and is generally not static. For example, it may drift randomly with time, flow and temperature. This inhibits the ability to determine the flow in a static fashion. To overcome this some form of dynamic excitation to the coils is typically provided in order to generate a dynamic component at the electrodes that can be differentiated from the background DC (or slowly varying) bias signal. This dynamic signal is normally pulsed DC or an AC signal.

While using some kind of alternating signal to excite the meter is usually necessary, it does introduce its own particular problem, namely that electromagnetic coupling between the coil current and the electrode wires typically creates a signal at the electrodes when there is no fluid flow through the conduit. This signal is completely independent of any flow-generated signal at the electrodes and so the total signal received is the sum of the unwanted 'zero' term (the non-flow component) and the flow generated signal.

In a sinusoidally excited meter, this unwanted signal is typically at nominally 90 degrees to the wanted signal and hence is often termed the 'quadrature' signal. The unwanted signal is related to the rate of change of current in the coils and consequently is often described as being due to the 'transformer effect' where the coil winding is the primary and the electrode wiring is the secondary. In a perfectly symmetrical sensor, the signal created in the electrode wiring in a typical sensor should be zero but manufacturing tolerances mean that there is always some residual area in the electrode wiring 'loop' that picks up some of the primary current.

In a sinusoidally excited meter it is known to include some kind of phase adjustment in the phase-sensitive detector to null out this unwanted signal (this process can be performed in hardware, manually or automatically or in software). Performance of the system is often limited by the success of this zero removal system. In many systems where the adjustment is only made at one operating condition (factory calibration) then the system may exhibit errors at other operating conditions, typically temperature or installation related.

AC meters excited with a sinusoidal waveform (or a plurality of frequencies as we have previously shown) can be beneficial but require substantially continuous excitation. To reduce power consumption, for example in a battery-powered meter, intermittent excitation is preferred, and pulsed DC meters are typically used.

In 'pulse' or 'square wave' driven meters, the approach is usually to provide adequate settling time after the coil current is changed for the transient quadrature signal to die away (since it is related to the rate of change of coil current). These meters work well because there is substantially no quadrature signal but the need for the signal to die away has implications on the maximum speed at which the meter can be operated.

Conversely, if a measurement is not taken sufficiently quickly, there is a potential problem of zero drift. The "square wave" will not normally be true square wave as the slew rate will be limited by the apparatus and will often be deliberately limited to reduce effects of the high rate of change of current.

SUMMARY OF CERTAIN INVENTIVE EMBODIMENTS

The system and method described herein may provide a novel solution to at least some of the problems described above whereby a pulsed or square wave excitation can be used but the meter can be operated significantly faster than would normally be possible.

According to a first aspect the invention provides a method of obtaining a measure of flow from an electromagnetic flow meter comprising applying a shaped excitation waveform, receiving an output from the meter and resolving sampled output data from the meter into a non-flow waveform component and a flow waveform component to derive a measure of flow.

By shaped, we mean a waveform having a non-sinusoidal shape. The waveform can be considered as a shaped waveform comprising a plurality of frequency components, although the components may not be explicitly added as the signal may be directly generated in the time domain, for example using a Digital Signal Processor (DSP).

In this method, by taking the novel step of resolving into expected waveform components, rather than the conventional method of correlating each frequency component of the sampled output data with a sine wave, a number of advantages can be obtained. Although the shaped excitation waveform will effectively contain multiple frequency components, it has been found that it is not necessary to process each component separately to obtain a measure of flow.

Preferably, the shaped excitation waveform comprises a pulsed waveform. For a pulsed waveform, using the present method it may not be necessary to wait for transient signals to decay before a reading can be taken. This may provide the advantage over prior art systems that the delay time before the initial reading is taken can be reduced and the rate of repetition of reading of the meter can be increased.

Preferably, the shaped excitation waveform includes a first pulse rise section of a first polarity.

Preferably, the shaped excitation waveform includes a substantially constant section of a first polarity.

Preferably, the shaped excitation waveform includes a pulse decay section.

Preferably, the shaped excitation waveform includes a second pulse rise section.

Preferably, the shaped excitation waveform includes a second substantially constant section of the opposite polarity to the first substantially constant section.

Preferably, the shaped excitation waveform includes a second pulse decay section. Preferably, the second pulse rise, substantially constant and pulse decay sections are of the opposite polarity to the first pulse rise section, substantially constant and pulse decay sections.

Preferably, the shaped excitation waveform includes at least one substantially constant section. This may be, for example, at the beginning and/or end of a group of pulses in a pulsed DC system or it may be an inter-pulse constant section.

The constant section of the excitation waveform may advantageously be used to determine background interference using correlation. For example, the constant section may be used to determine 50 Hz interference.

Preferably, the background interference is subtracted from the sampled output data; this is preferable to simple filtering.

Preferably, the shaped excitation waveform includes a plurality of pulse rise sections, substantially constant sections and pulse decay sections.

Preferably, alternate substantially constant sections are of alternate opposing polarities.

The features provided may allow a pulsed shaped excitation waveform to be used. Preferably, a substantially square wave waveform may be used (although the slew rate will normally be limited and so it will not be a perfect square wave). Preferably wherein alternate pulses of the square wave are of opposing polarities, although more complex patterns having opposing polarities.

This technique may provide a number of advantages, for example, resolving the output data into components may allow the method to be used with a wide variety of input waveforms, since the method is not dependent on the input waveform used.

The method of resolving into a non-flow component and a flow component may be more accurate and more flexible than subtracting a constant predetermined zero signal from the sampled output data, since the zero signal subtracted may not accurately represent the zero signal at the time the reading was taken.

Preferably, the resolving step comprises performing a weighted least squares fit between the sampled output data and a model of the expected waveform, the expected waveform comprising a flow component and a non-flow component. Other methods of resolving the output data into components to fit the data to the model of the expected waveform may also be used.

According to one embodiment, the non-flow waveform component may be represented in the form $z.Vz(t)$.

$Vz(t)$ may be based on the differential of the current input to produce the excitation waveform, that is $dI/dt$. This has been found to provide a good model for the non-flow component term.

According to an alternative embodiment, $Vz(t)$ may be based on a zero signal captured empirically. In this embodiment, the non-flow component is preferably based on an average of a plurality of captured zero signals. This may provide a more accurate representation of the non-flow component. The zero signals may be captured at a plurality of different operating conditions, for example at a plurality of different temperatures, and the non-flow component used may be varied depending on the operating conditions when the sampled output data is taken.

$z$ is preferably a scalar multiplier term and may be designated the non-flow co-efficient. The value of the co-efficient is preferably determined during the resolving step. The co-efficient preferably represents the relative amount of the non-flow component present in the sampled output data.

According to one embodiment, the flow waveform component may be represented in the form $f.Vf(t)$.

In one embodiment, $Vf(t)$ may be determined empirically. For example, the component may be determined experimentally using one or more flow rates at one or more sets of operating conditions. Preferably, the component may be based on an average of a plurality of captured flow signals. This may allow experimental errors in the expected flow component to be reduced and may provide a more accurate expected flow component.

According to an alternative embodiment, $Vf(t)$ may be modelled by a mathematical function. For example, $Vf(t)$ may be expected to be generally proportional to the magnetic field.

$f$ is preferably a scalar multiplier term and may be designated the flow co-efficient. The value of the co-efficient is preferably determined during the resolving step. The co-efficient preferably represents the relative amount of the flow component present in the sampled output data.

According to a preferred embodiment, the method preferably further comprises determining a measure of a trend within the sampled output data. A trend may result, for example, from experimental effects such as heating of the components of the flow meter. The trend may be, for example, a linear trend or an exponential trend.

Preferably, the measure of a trend may be subtracted from the sampled output data. This may allow a more accurate measurement of the flow rate to be determined.

According to one embodiment, the correlating step is performed over a window that does not contain an integer number of periods of all frequency components. Hence the system described herein may be more flexible and determination of the flow rate may not be dependent on the input waveform used.

Preferably, the window may be shorter than the period of the lowest frequency component. This may allow the measurement of the flow rate to be obtained with a higher bandwidth than the lowest frequency component.

According to a further aspect there is provided a method of determining a measure of a non-flow signal from an electromagnetic flow meter comprising:

applying a shaped excitation waveform to an electromagnetic flow meter;

receiving an output from the meter;

resolving sampled output data from the meter into a non-flow waveform component and a flow waveform component;

determining a measure of the non-flow component.

In prior art flow meters, a predetermined non-flow component is subtracted from the sampled output data to remove the non-flow effects from the output signal. For example, the part of the sampled output data that is due to transformer effects within the meter itself can be removed in this way. Determining the magnitude of this non-flow component itself has not seemed particularly useful, since it provides no indication of the flow rate of the fluid. However, it has been appreciated by the inventors that, surprisingly, determining the magnitude of this non-flow component itself can provide a useful tool to improve the accuracy of flow readings. For example, determination of the non-flow component can be used to check that the flow meter is within calibration tolerance and is free from faults. This may prevent systematic errors being introduced to flow rates that are subsequently determined. If the flow meter is in an environment with particularly high or low temperatures, or with highly fluctuating temperatures, it may be particularly useful to ensure that the meter remains within calibration tolerance and the present method may allow this to be done while the flow meter is in situ and over an extended period of time.

The ability for the meter to provide a meaningful self-diagnosis may be very beneficial—a dynamic estimate of the meter accuracy may be provided. For example, it might be that under unfavourable conditions, the meter is only 1% accurate but under good signal conditions may be 0.05% accurate or better. The meter may determine a measure of accuracy, preferably based on the non-flow signal, and may report this with the measurement value. Downstream equipment may use the dynamically reported figure, rather than having to assume a worst case accuracy of 1%.

Preferably, the method further comprises determining a calibration measurement for the meter based on the measure of the non-flow component.

Preferably, the method further comprises applying a correction to flow measurements determined by the flow meter based on the calibration measurement determined. Hence a non-flow component determined in this way may also be input back into the system to be incorporated into later readings that are taken in the presence of flowing fluid to determine more accurately the flow rate.

According to a further embodiment, the method may further comprise detecting a fault condition for the meter based on the measure of the non-flow component. A fault with the meter may be brought to the attention of the operator so that readings may be adjusted accordingly or so that the fault may be corrected.

Preferably, the shaped excitation waveform is a pulsed waveform. The waveform preferably has at least some of the features of the waveform described for the previous aspect. Preferably, the waveform is a generally square wave pulse waveform.

Preferably, the non-flow waveform component is represented in the form z.Vz(t), wherein Vz(t) is a function of the current input to form the excitation waveform and z is a scalar multiplier term. The value of z is preferably determined as part of the present method.

Preferably, the flow waveform component is represented in the form f.Vf(t), wherein Vf(t) is a function of the flow rate of a fluid through the flow meter and f is a scalar multiplier term.

Features of the first method may be applied to the second method and corresponding advantages may be provided.

According to a further aspect, there is provided apparatus for obtaining a measure of flow from an electromagnetic flow meter comprising:
means for applying a shaped excitation waveform;
means for receiving an output from the meter; and
means for processing the output from the meter to resolve sampled output data from the meter into a non-flow waveform component and a flow waveform component to derive a measure of flow.

Features of the method aspect described above may be applied to the apparatus aspect and may provide corresponding advantages.

According to a further aspect there is provided a computer program or computer program product for carrying out a method according to the method aspects described above or any of their preferred features.

BRIEF DESCRIPTION OF THE DRAWINGS

Embodiments of the invention will now be described by way of example with reference to the accompanying drawings in which.

DETAILED DESCRIPTION OF CERTAIN INVENTIVE EMBODIMENTS

Figure 1:
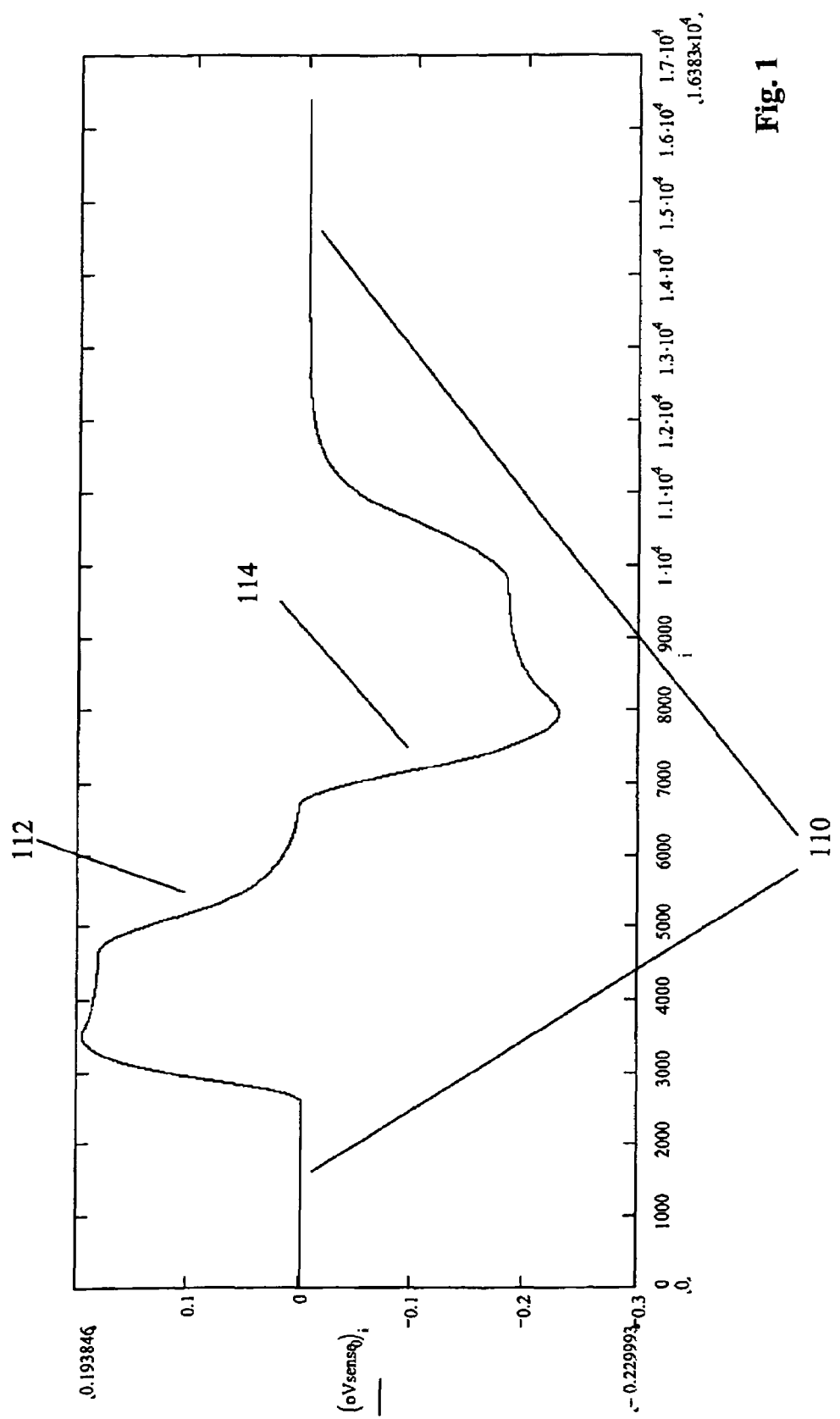
FIG. 1 illustrates one possible coil excitation signal (current) for a meter.

FIG. 1 illustrates one possible coil excitation signal for a meter. The waveform illustrated may be created by a controlled drive voltage, for example by a Central Processing Unit (CPU) and a Digital-to-Analogue (D/A) converter. As described in more detail below, in the present embodiment, the precise waveform is not important, however features of the pulse may include that it is zero outside the active pulse region 110 and that the pulse has some AC content, i.e. it goes positive 112 and negative 114 at least once. In most embodiments, drive voltages may be slew-rate limited, since this may create signals which are less problematic for the equipment as rapid changes make the relationship between field and applied current less predictable.

Figure 2:
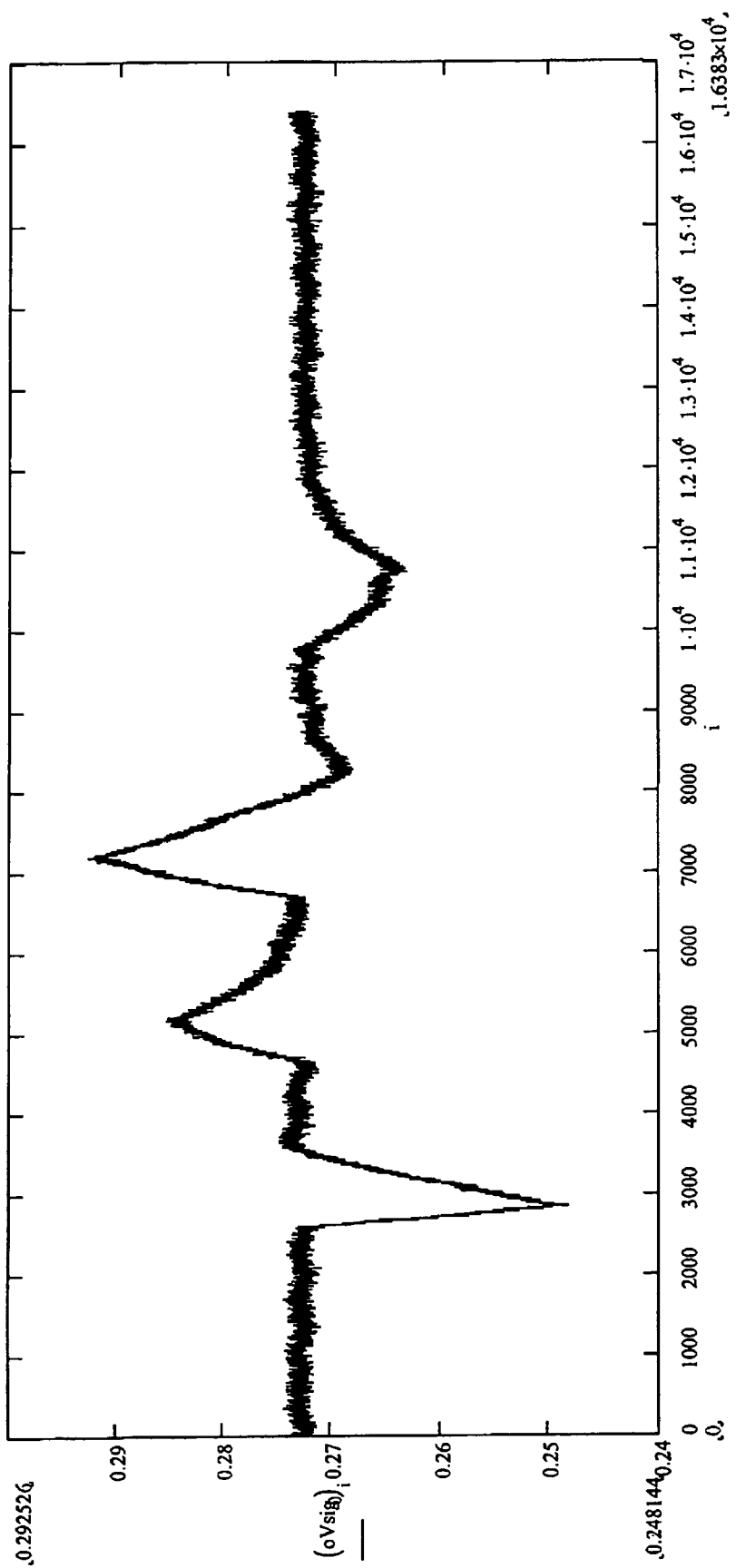
FIG. 2 shows an electrode signal produced by a sensor when driven by the coil excitation signal illustrated in FIG. 1.

FIG. 2 illustrates an electrode signal produced by a real sensor in the absence of fluid flowing past the sensor when driven by the coil current shown in FIG. 1. This signal may be known as the zero signal.

This electrode signal has high frequency noise and a small amount of mains interference and other corruption. The signals captured here are from an unshielded sensor. Signals captured from production sensors, which may have shields incorporated with them may not show as much noise. However, the techniques described herein can preferably operate in the presence of such distortions. In the present embodiment, the electrode signal captured can be sufficiently accurately described as a scaled rate of change of the current (I) with respect to the time (t), that is a dI/dt of the coil excitation signal shown in FIG. 1.

When there is flow present, there will be an additional component which is generally proportional to the flow rate and to the magnetic field, the magnetic field being generally proportional to the coil current (but not exactly because of factors such as hysteresis and magnetic circuit eddy currents).

Figure 3:
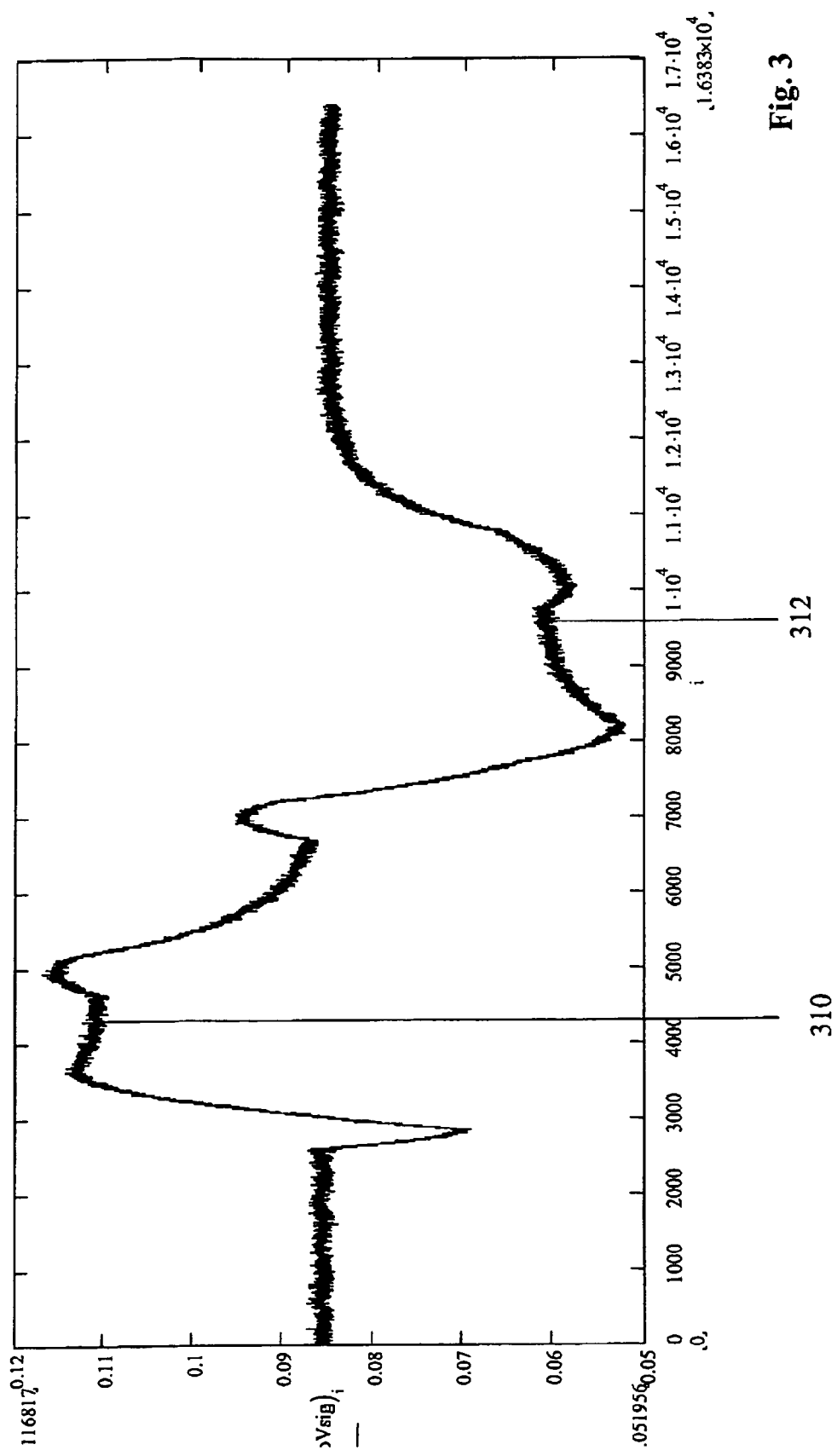
FIG. 3 shows the total signal, that is the zero signal and the flow-induced signal for a particular flow rate.

FIG. 3 shows the total signal for a particular flow rate, that is the non-flow signal and the flow-induced signal. Points 310 and 312 (at about x=4400 and about x=9500) are the points where, after a longer settling time, most prior art systems would choose to derive the flow signal as, in principle, the flow rate can be determined based on the result of calculating (Va−Vb)/2. Note further that in this case, the signal at A and B is not settled before the coil current is changed.

Figure 4:
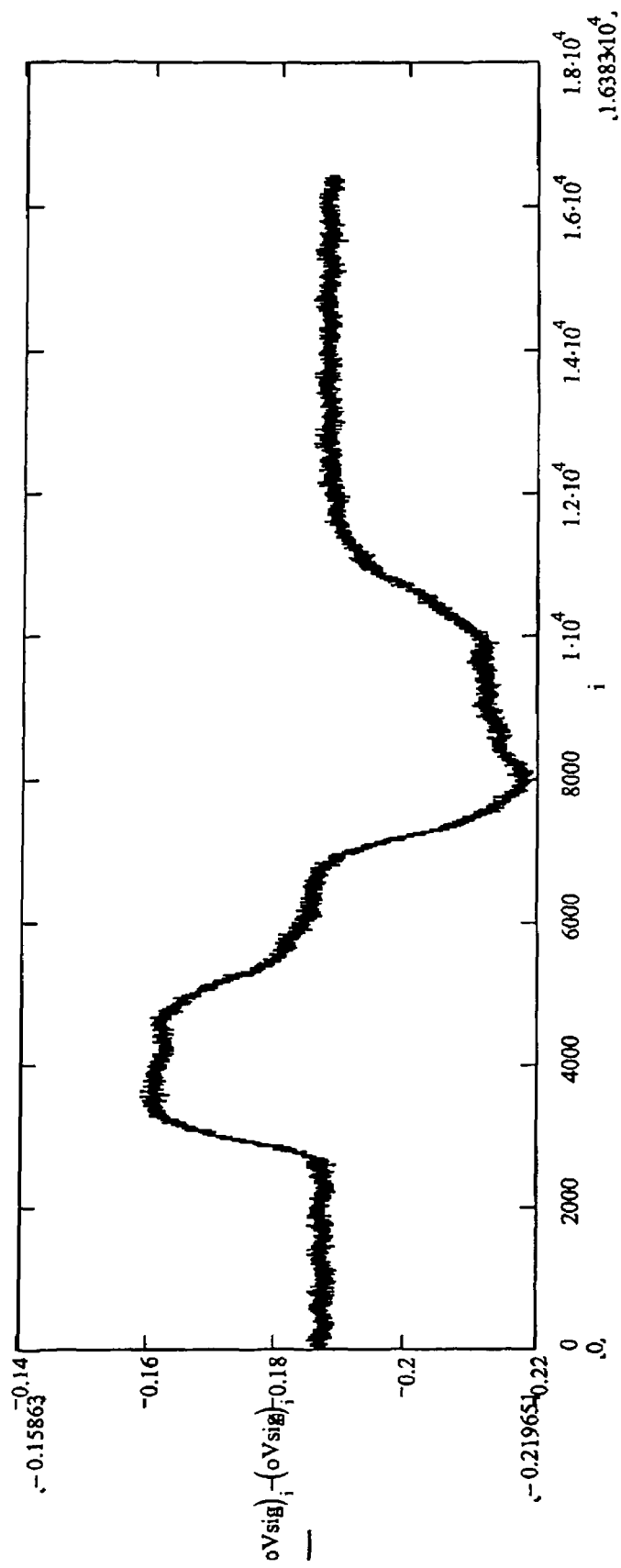
FIG. 4 shows the electrode signal of FIG. 3 with the zero signal of FIG. 2 subtracted.

It will be appreciated that the non-flow signal could be subtracted from this waveform and, if the non-flow signal can be expected to remain completely constant, then this would be a useful thing to do. FIG. 4 shows the waveform after FIG. 2, the non-flow signal, has been subtracted.

It can be seen that the waveform is now closer to an ideal signal. However, the technique described herein has more flexibility than this, particularly when the non-flow signal might be expected to change, for example for wide temperature applications.

According to the present embodiment, the technique is to find coefficients z and f such that:

$$z.Vz(t)+f.Vf(t)$$

matches the measured shaped waveform as closely as possible.

Where Vz(t) is a captured non-flow signal and Vf(t) is the expected flow component in the absence of a non-flow/quadrature term.

In the present embodiment, z and f are scalar multipliers that represent the amount of the non-flow and flow components present in the sampled output data.

This approach may be more flexible and accurate than simply subtracting a predefined non-flow signal, particularly if the non-flow signal being subtracted does not accurately reflect the current non-flow signal.

As will be appreciated, the technique is generic and does not depend in any way upon the exact waveforms being used, though it is useful for the waveforms to have certain characteristics (or to not have certain characteristics), some of which are discussed in more detail below.

An example of a fitting technique that may be used to determine the co-efficients z and f is weighted least squares. The technique has been found to fit the real data over all measured flow rates with no systematic residual error, just random noise.

The flat, zero section outside the pulse 110 may be used to determine 50 Hz (or other mains or other significant source e.g. 60 Hz) interference using correlation. The magnitude and phase of the interference as derived from this section may then be subtracted from the whole window. This is found to be more effective than trying to filter out the interference as the waveform is less distorted.

The flat zero sections may also be used to identify and remove any linear trend from the measured electrode signal prior to further processing.

Multiple captures of the non-flow signal can be taken (offline) and may then be averaged to create a very clean non-flow signal prior to being used in a weighted least squares regression.

Similarly, multiple flow signals can be taken and may be averaged to get the Vf(t) term prior to a weighted least squares regression.

The technique may also be used to identify that zero is drifting if z shows a systematic shift from the factory calibrated or site calibrated value.

In one embodiment, the current waveform may be used as the Vf(t) and/or dI/dt may be used as the Vz(t).

Figure 5:
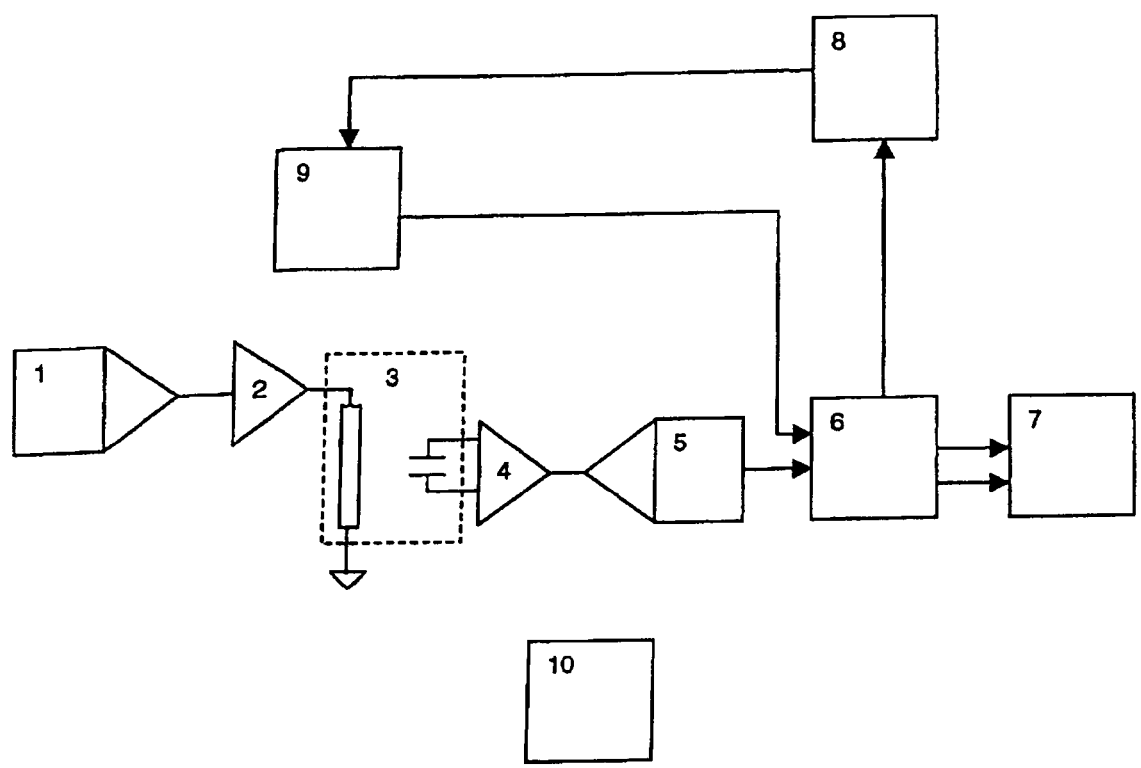
FIG. 5 is a schematic diagram of one embodiment of the invention.

One embodiment of a practical system will now be described in more detail with reference to FIG. 5. A microprocessor 10 may be provided which may maintain a 'time' variable to calculate drive signals. The drive signals, for example a square wave signal, may be applied to the drive coil in the sensor 3 via power amplifier 2. The electrode signals may then be amplified 4 and may be converted into discrete samples by ADC 5. Software modules running on the microprocessor 10 may be used to implement the methods described herein. The amplified output of the flow meter may be resolved into a flow component and a non-flow component 6 and a measure of the non-flow component may be determined 8. This may allow a correction term to be calculated 9 and fed back into the system 6 to allow a more accurate flow rate to be determined 6 and output 7.

The length of the samples may be set, to a fixed period (e.g. 25 ms is convenient) or may be adjustable, for example by setting a parameter at the microprocessor 10.

In one embodiment, a confidence value may also be determined for each flow reading output. This may be used, for example, to "weight" the data for filtering purposes. A number of different filtering and weighting algorithms may be used and the choice may depend on the application.

Modifications of detail may be made to the method and system described and features disclosed herein may be provided independently or in other combinations.

What is claimed is:

1. A method of obtaining a measure of flow from an electromagnetic flow meter, comprising:

applying a shaped excitation waveform to a coil of an electromagnetic flow meter;

receiving and sampling an output signal from the meter in response to the application of the shaped excitation waveform; and resolving sampled output data from the meter into a non-flow waveform component and a flow waveform component so as to derive a measure of flow.

2. A method according to claim 1, wherein the shaped excitation waveform comprises a pulsed waveform.

3. A method according to claim 1, wherein the shaped excitation waveform includes a first pulse rise section of a first polarity.

4. A method according to claim 3, wherein the shaped excitation waveform includes a second pulse rise section.

5. A method according to claim 4, wherein the second pulse rise, substantially constant, and pulse decay sections are of the opposite polarity to the first pulse rise section, substantially constant, and pulse decay sections.

6. A method according to claim 3, wherein the shaped excitation waveform includes a second substantially constant section.

7. A method according to claim 3, wherein the shaped excitation waveform includes a second pulse decay section.

8. A method according to claim 1, wherein the shaped excitation waveform includes a substantially constant section of a first polarity.

9. A method according to claim 1, wherein the shaped excitation waveform includes a pulse decay section.

10. A method according to claim 1, wherein the shaped excitation waveform comprises at least one substantially constant section.

11. A method according to claim 10, wherein the constant section of the shaped excitation waveform is used to determine background interference.

12. A method according to claim 11, wherein the background interference is subtracted from the sampled output data.

13. A method according to claim 1, wherein the shaped excitation waveform comprises a plurality of pulse rise sections, substantially constant sections, and pulse decay sections.

14. A method according to claim 13, wherein alternate substantially constant sections are of alternate opposing polarities.

15. A method according to claim 1, wherein the shaped excitation waveform is a substantially square wave waveform.

16. A method according to claim 15, wherein alternate pulses of the square wave are of opposing polarities.

17. A method according to claim 1, wherein resolving comprises performing a weighted least squares fit between the sampled output data and a model of the expected waveform.

18. A method according to claim 1, wherein the non-flow waveform component is represented in the form z.Vz(t).

19. A method according to claim 18, wherein Vz(t) is based on the differential of the current input to produce the excitation waveform (dI/dt).

20. A method according to claim 18, wherein Vz(t) is based on a zero signal captured empirically.

21. A method according to claim 20, wherein Vz(t) is based on an average of a plurality of captured zero signals.

22. A method according to claim 18, wherein z is a scalar multiplier term, and wherein resolving includes determining the value of z.

23. A method according to claim 1, wherein the flow waveform component is represented in the form f.Vf(t).

24. A method according to claim 23, wherein Vf(t) is determined empirically.

25. A method according to claim 24, wherein Vf(t) is determined empirically and is based on an average of a plurality of captured flow signals.

26. A method according to claim 23, wherein Vf(t) is modelled by a mathematical function.

27. A method according to claim 23, wherein f is a scalar multiplier term, and wherein resolving comprises determining the value of the scalar multiplier term f.

28. A method according to claim 1, further comprising determining a measure of a trend within the sampled output data.

29. A method according to claim 28, wherein the measure of a trend is subtracted from the sampled output data.

30. A method according to claim 1, wherein correlating is performed over a window that does not contain an integer number of periods of all frequency components.

31. A method according to claim 30, wherein the window is shorter than the period of the lowest frequency component.

32. A method of determining a measure of a non-flow signal from an electromagnetic flow meter comprising:
applying a shaped excitation waveform to an electromagnetic flow meter;
receiving an output from the meter in response to application of the shaped excitation waveform;
resolving sampled output data from the meter into a non-flow waveform component and a flow waveform component; and
determining a measure of the non-flow waveform component based at least in part on the resolved sampled output data.

33. A method according to claim 32, further comprising determining a calibration measurement for the meter based on the measure of the non-flow component.

34. A method according to claim 33, further comprising applying a correction to flow measurements determined by the flow meter based on the calibration measurement determined.

35. A method according to claim 32, further comprising detecting a fault condition for the meter based on the measure of the non-flow component.

36. A method according to claim 32, wherein the shaped excitation waveform is a pulsed waveform.

37. A method according to claim 32, wherein the non-flow waveform component is represented in the form z.Vz(t), and wherein Vz(t) is a function of the current input to form the excitation waveform and z is a scalar multiplier term.

38. A method according to claim 32, wherein the flow waveform component is represented in the form f.Vf(t), wherein Vf(t) is a function of the flow rate of a fluid through the flow meter, and wherein f is a scalar multiplier term.

39. An apparatus for obtaining a measure of flow from an electromagnetic flow meter comprising:
means for applying a shaped excitation waveform to the coil of an electromagnetic flow meter;
means for receiving an output from the meter; and
means for processing the output from the meter to resolve sampled output data from the meter into a non-flow waveform component and a flow waveform component so as to derive a measure of flow.

40. An apparatus for determining a measure of a non-flow signal from an electromagnetic flow meter comprising:
means for applying a shaped excitation waveform to an electromagnetic flow meter;
means for receiving an output from the meter;
means for resolving sampled output data from the meter into a non-flow waveform component and a flow waveform component; and
means for determining a measure of the non-flow waveform component.

41. A computer readable medium including a program for executing a method of obtaining a measure of flow from an electromagnetic flow meter, comprising:
applying a shaped excitation waveform to an electromagnetic flow meter;
receiving an output from the meter; and
resolving sampled output data from the meter into a non-flow waveform component and a flow waveform component to derive a measure of flow.

* * * * *

UNITED STATES PATENT AND TRADEMARK OFFICE
CERTIFICATE OF CORRECTION

PATENT NO. : 6,973,839 B2
APPLICATION NO. : 10/817327
DATED : December 13, 2005
INVENTOR(S) : Wray, Troy It is certified that error appears in the above-identified patent and that said Letters Patent is hereby corrected as shown below:

On page 1, in the Title, after "METER" delete "HAVING PROCESSING MEANS RESOLVING OUTPUT DATA INTO A NON-FLOW WAVEFORM COMPONENT".

In the Specification, Column 1, in the Title, after "METER" delete "HAVING PROCESSING MEANS RESOLVING OUTPUT DATA INTO A NON-FLOW WAVEFORM COMPONENT".

In the Specification, Column 1, Line 10, After "10/817,765," insert --Attorney Docket No. MATH2.001AUS,--.

Signed and Sealed this

Twenty-second Day of August, 2006

JON W. DUDAS
*Director of the United States Patent and Trademark Office*